US008600036B1

United States Patent
Warder (10) Patent No.: US 8,600,036 B1
(45) Date of Patent: *Dec. 3, 2013

(54) SYSTEM OF REVERSE CALL BRANCH OFF-LOAD

(75) Inventor: Jamie Warder, Macedonia, OH (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 406 days.

This patent is subject to a terminal disclaimer.

(21) Appl. No.: 12/877,851

(22) Filed: Sep. 8, 2010

(51) Int. Cl.
*H04M 3/523* (2006.01)

(52) U.S. Cl.
USPC ............ 379/265.11; 379/265.12; 379/265.13; 379/266.02

(58) Field of Classification Search
None
See application file for complete search history.

(56) References Cited

U.S. PATENT DOCUMENTS

| | | | | |
|---|---|---|---|---|
| 5,335,269 | A * | 8/1994 | Steinlicht | 379/266.05 |
| 6,064,730 | A * | 5/2000 | Ginsberg | 379/265.09 |
| 6,134,530 | A * | 10/2000 | Bunting et al. | 705/7.25 |
| 6,222,919 | B1 * | 4/2001 | Hollatz et al. | 379/265.12 |
| 6,512,825 | B1 * | 1/2003 | Lindholm et al. | 379/266.01 |
| 6,798,876 | B1 * | 9/2004 | Bala | 379/265.12 |
| 7,149,303 | B1 * | 12/2006 | Laurinavichus | 379/265.01 |
| 7,881,454 | B2 * | 2/2011 | Tuchman et al. | 379/266.01 |
| 8,023,639 | B2 * | 9/2011 | Conway et al. | 379/266.1 |
| 2005/0043986 | A1 * | 2/2005 | McConnell et al. | 705/11 |
| 2007/0206769 | A1 * | 9/2007 | O'Dell | 379/265.01 |
| 2009/0122972 | A1 * | 5/2009 | Kaufman et al. | 379/265.12 |
| 2009/0122973 | A1 * | 5/2009 | Jay et al. | 379/266.01 |
| 2009/0154688 | A1 * | 6/2009 | Jay et al. | 379/265.12 |

OTHER PUBLICATIONS

U.S. Appl. No. 12/887,831, filed Sep. 8, 2010.

* cited by examiner

*Primary Examiner* — Harry Hong
(74) *Attorney, Agent, or Firm* — Buchanan Ingersoll & Rooney PC; Robert J. Pugh (57) ABSTRACT

A computer-implemented system for routing a call to a call center may generally comprise a computer system comprising at least one processor and a storage device comprising computer-readable medium in communication with the processor and storing instructions adapted to be executed by the processor to receive a call from a caller at an automated call distributor, initiate an interactive voice response interrogation session with the caller, and classify the call as one of a first type and a second type based on the interactive voice response interrogation session, when the call type is classified as the first type, route the call to at least one of a plurality of branches comprising at least one agent designated to receive calls classified as the first type, when the call type is classified as the second type, route the call to a call center comprising at least one agent designated to receive calls classified as the first type and the second type.

21 Claims, 4 Drawing Sheets

SYSTEM OF REVERSE CALL BRANCH OFF-LOAD

BACKGROUND

The present disclosure generally relates to communication methods, and more particularly, methods for processing calls by reverse routing incoming calls to a call center of an institution to a branch office of the institution.

Call centers may be utilized by institutions such as businesses and other entities to process inquiries, usually by telephone, by customers for sales, information, customer support, and other services. Call centers may be configured to route multiple incoming, customer-initiated calls to agents that provide sales, information, and/or support on behalf of the business. An Automatic Call Distributor (ACD) may be utilized to selectively route the incoming calls to the agents. Under certain circumstances, such as peak calling periods, the availability of agents at the call center may be insufficient to process the volume of calls within a reasonable period of time. When the number of incoming calls to the call center is greater than the number of available agents, the incoming calls may be placed in a queue.

A common complaint among callers contacting call centers is a long wait time in the queue. The wait time in the queue may depend on, among other factors, the volume of calls and the number of agents at the call center. The institutions may not want to have consumers waiting in the queue for unreasonable periods of time, however, the institutions may not want to have many agents waiting for calls because hiring, training, and maintaining agents are expensive. Accordingly, more efficient and/or cost effective systems and methods for processing and/or routing incoming calls to a call center are desirable.

SUMMARY

According to certain embodiments, more efficient and/or cost-effective methods for processing calls by reverse routing incoming calls to a call center of an institution to a branch office of the institution are disclosed.

In certain embodiments, a computer-implemented system for routing a call to a call center may generally comprise a computer system comprising at least one processor and a storage device comprising computer-readable medium in communication with the processor and storing instructions adapted to be executed by the processor to receive a call from a caller at an automated call distributor, initiate an interactive voice response interrogation session with the caller, and classify the call as one of a first type and a second type based on the interactive voice response interrogation session, when the call type is classified as the first type, route the call to at least one of a plurality of branches comprising at least one agent designated to receive calls classified as the first type, when the call type is classified as the second type, route the call to a call center comprising at least one agent designated to receive calls classified as the first type and the second type.

In certain embodiments, a computer-implemented system for routing a call to a call center may generally comprise a computer system comprising at least one processor and a storage device comprising computer-readable medium in communication with the processor and storing instructions adapted to be executed by the processor to receive a call from a caller at an automated call distributor, initiate an interactive voice response interrogation session with the caller, authenticate the call based on the interactive voice response interrogation session, determine the geographic region of the caller based on the interactive voice response interrogation session, and predict the call as one of a first type and a second type based on the interactive voice response interrogation session, when the call type is classified as the first type, route the call to a branch in the caller's geographic region comprising at least one agent designated to receive calls classified as the first type, when the call type is classified as the second type, route the call to a call center comprising at least one agent designated to receive calls classified as the first type and the second type.

DESCRIPTION OF THE DRAWING FIGURES

The various embodiments described herein may be better understood by considering the following description in conjunction with the accompanying drawing figures.

DESCRIPTION OF CERTAIN EMBODIMENTS

As generally used herein, the term "call" refers to audio, video, and/or data communications that a call center is capable of processing, such as, for example, phone communications, electronic mail, interactive chat, instant messaging, video conferencing, voice messaging, and combinations thereof.

Figure 1:
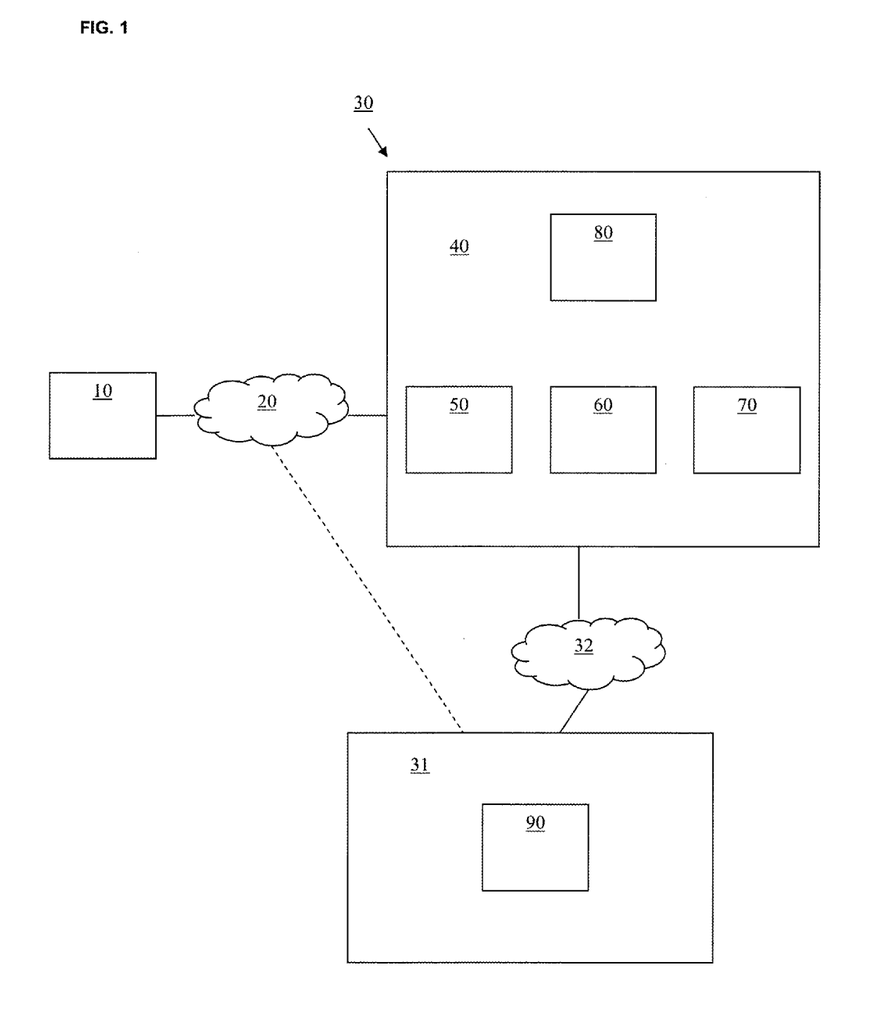
FIG. 1 is a system diagram according to certain embodiments of a communication system.

FIG. 1 illustrates an embodiment of a communications system comprising a communication device 10 (e.g., terminal, consumer terminal), a communication network 20, and a call center 30. The call center 30 may comprise at least one location where at least one agent may receive customer calls. The call center 30 may comprise a call center processing system 40 comprising an automatic call distributor (ACD) 50, an interactive voice response (IVR) system 60, one or more databases 70, and at least one agent terminal 80. The call center may comprise at least one agent terminal 80 and at least one remote agent terminal 90. The call center 30 may be in communication with at least one remote agent terminal 90. The call center processing system 40 may comprise a telephony switching apparatus (TSA), a private branch exchange (PBX), and/or a public switch telephone network (PSTN). The call center processing system 40 may comprise a computer telephony integration server, a customer database server, and an application server. The call center processing system 40 may comprise authentication software and routing software. The agent may interact with an agent terminal comprising 80, 90 a user interface and/or a workstation. The agent terminal 80, 90 may comprise a communication device such as, for example, a telephone, a computer, smart wireless telephone, among other communication devices. Other devices connecting to the components of the call center 30, e.g. switches, routers, servers, among other components, are omitted for conciseness and clarity of disclosure. Moreover, while separate components are illustrated for convenience, one of ordinary skill in the art would understand that one or more of the components may be combined into a single component while still maintaining the indicated functionality.

In one embodiment, the call center 30 may be in communication with one or more remotely-located branches 31 located in different geographic regions. The geographic location of the one or more than one remotely-located branch 31 and the geographic location of the call center 30 may be different. The call center processing system 40 may route calls to a call center of an institution to a branch office of the institution. The call center processing system 40 may route calls to an agent terminal 80 at the call center 30 as well as an agent terminal 90 at the one or more than one remotely-located branch 31. A branch 31 may comprise at least one agent terminal 90 in communication with the call center 30. Although the call center processing system 40 may communicate with each of the one or more than one branch 31 via the communication network 20 or other communication network 32, at least one of the branches 31 may receive calls directly from callers via a different communication network. At least one of or all of the branches 31 may comprise agents having different skills, knowledge, and/or primary responsibilities than agents at the call center 30. In one embodiment, at least one of or all of the branches 31 may comprise a financial institution such as a bank, for example, and the agent may comprise a branch manager, a branch assistant manager, a platform employee, and a teller. In one embodiment, at least one of or all of the branches 31 may comprise the agent's home and/or residence.

In one aspect, the caller may initiate a call to the call center 30 using the communication device 10 (e.g., terminal, consumer terminal). The call may be initiated using any assigned number, such as a toll-free number, associated with the call center via the communication network. The toll-free number may be associated with the geographic region of the call center 30. The communication device 10 may comprise any communication device or devices capable of originating and/or receiving calls, such as, for example, a telephone, a cellular phone, a computer, a personal digital assistant, and a voice over Internet Protocol (VoIP) phone, a smart phone, among other communication devices. The call may comprise a voice telephony call, a video-based call, a text-based instant messaging (IM) session, and a VoIP call. Therefore, the term call should not be limited in any context to a voice based call. The communication device 10 may exchange audio, video, and/or data with the call center, such as, for example, the ACD, IVR, and/or agent terminal, via the communication network 20.

In one embodiment, the communication network 20 may be configured to transmit calls to and from the communication device 10 and the call center 30. The communication network 20 may comprise one or more suitable networks for transmitting calls, such as, for example, a PSTN, a cellular telephone network, the Internet, and a private intranet, such as a local area network (LAN) and a wide area network (WAN), among other communication networks.

In one embodiment, the ACD may be configured to receive incoming calls from the communication network 20 and route the calls to the agent terminals 80 and/or the IVR system 60. The ACD may route the call to an agent 80 at the call center 30 and/or an agent 90 at the branch 31 based on predetermined routing instructions. The ACD may route the call to the IVR system 60 and, based at least in part on information received during the IVR interrogation session, redirect the call back to the ACD for routing to an agent terminal 80. The ACD may comprise a router or other device configured to route calls to an agent terminal 80. Features generally associated with the ACD may comprise hosting agents, routing calls to local agents and/or remote agents, bridging multiple calls together, and transferring calls from agent to agent.

In one embodiment, the call center processing system 40 may comprise an inbound call queue for storing calls received by the call center 30 until being routed to an agent terminal 80. The calls may be stored in the inbound call queue when all agents 80 are busy or unavailable. The queued call may be routed to an agent 80 when one becomes available. In one embodiment, the calls may be routed to an agent 90 at the branch 31 when the agent 80 are not available. The inbound call queue may place a call on hold until the call is routed to the agent 80. The inbound call queue may comprise a first in, first out (FIFO) queue.

In one embodiment, the IVR system 60 may be configured to provide information to the callers and/or receive information from the caller. The IVR system 60 may comprise an automated system that presents one or more voice prompts to the caller and/or interactive menus through which the caller may make selections to solicit information from the caller. The IVR system 60 may receive information from the caller via any suitable methods, devices, techniques or other means, such as, for example, manual interaction via touchtone key input by the caller, voice recognition, and/or data received from the caller. The IVR system 60 may comprise a voice computer configured to translate text into voice and voice into text to make existing database information accessible by phone. The IVR system 60 may comprise an interface for automatic speech recognition, speech to e-mail, e-mail to speech, speech to fax, and fax to speech. It will be appreciated that as advances are made in video telephony technology by way of the Internet or other broadband communication networks such as SKYPE®, for example, the present disclosure contemplates the use of video technology to implement an IVR like system that the caller can use to interact with the call center 30. Accordingly, the implementation of the IVR system 60 should not be limited to the particular embodiment described in the context of the present disclosure.

In one aspect, the voice prompts and/or interactive menus may be associated with a financial institution. The voice prompts and/or interactive menus may comprise customer checking and saving account information, certificate of deposit (CD) information, and individual retirement account (IRA) information. The voice prompts and/or interactive menus may be associated with the triggering event. The voice prompts and/or interactive menus may comprise a business name and/or a geographic location.

In one aspect, the information solicited and/or received by the IVR system 60 may be associated with the communication device 10 employed by the caller. Information associated with the caller may comprise personal information, an order number, product information, acquisition code, recent calls and support questions, and purpose of the call. Personal information may comprise demographic information, caller's language, a customer name, an account number, a personal identification number, a user identifier, an address, a social security number, a driver's license number, a birth date, and an answer to a challenge question. Information associated with the caller terminal may comprise an automatic number identification (ANI), a dialed number identification service (DNIS), a mobile subscriber number and an IP address.

In one aspect, based on the information received by the IVR system 60, information associated with the caller may be located and retrieved from the one or more than one databases 70 available to the call center 30 (e.g., located at the call center 30 or located remotely from and capable of communicating with the call center 30). The databases 70 may comprise customer information, such as, for example, customer records. The customer records may comprise a name field that stores the name of a caller, an account number, and/or an identification number. The customer record may include other information or additional fields, such as, for example, checking and saving account information, CD information, and IRA account information. The information associated with the caller may be transmitted to the caller terminal associated with the communication device 10 and/or agent terminal 80, 90.

In one embodiment, the call center processing system 40 may determine a call type based on the information received by the IVR system 60 and/or the information retrieved from the one or more than one database 70. In certain embodiments, the call center processing system 40 may predict a call type based on the information received by the IVR system 60 and/or the information retrieved from at least one database 70. In certain embodiments, the call center processing system 40 may classify the call as one of a first type and a second type based on the information received by the IVR system 60 and/or the information retrieved from at least one the database 70. In certain embodiments, the call center processing system 40 may determine the geographic region of the caller and/or identity of the caller based on the information received by the IVR system 60 and/or the information retrieved from at least one database 70.

In one aspect, the call center processing system 40 may comprise routing instructions based on the information received by the IVR system 60 and/or the information retrieved from the at least one database 70. The information retrieved from the at least one database 70 may comprise at least one of caller parameters, call center parameters, agent parameters, triggering event(s), among others. The routing instructions may determine to route the caller an agent or group of agents at the call center and/or at least one of the plurality of branches. In certain embodiments, the method may comprise updating the routing instructions based on a triggering event. In certain embodiments, the method may comprise weighting the caller parameters, call center parameters, agent parameters, and/or a triggering event. For example, the call center parameters may be weighted the same or different as the agent parameters. In certain embodiments, the method may comprise weighting the one or more parameters comprising each of the caller parameters, call center parameters, agent parameters, and/or a triggering event. For example, one of the agent parameters may be weighted the same or different as other agent parameters.

In one aspect, caller parameters may be associated with callers and likely callers. Caller parameters may comprise information associated with the caller such as identity, personality, geographic location, age, demographic data, income data, credit data, knowledge of the locations of the call center, answers to survey questions, the number dialed by the caller, call reason, call type, predicted call type, and the like. The caller parameters may be used to identify call types and/or classify call types. The caller parameters may be used to predict the purpose of the call based on the likelihood that the caller will discuss certain subject matter. The parameters may be stored in a database for use by the call center processing system.

In one aspect, call center parameters, which include branch parameters, may comprise the average speed of answer, the geographic region of the call center, the number of agents at the call center, the number of agent terminals at the call center, the maximum number of agent terminals supported by the call center, the maximum number of callers that may be routed to the call center, the capacity of the call center to service its existing client base, the current market associated with the call center, the current rates associated with the call center, and the accessibility of the call center to the agents. For example, the call center may be closed due to a holiday, emergency, and/or disaster. The parameters may be stored in a database for use by the call center processing system.

In one aspect, agent parameters may comprise performance parameters and utilization parameters. The performance parameters may comprise an agent's technical expertise in a field and/or associated with a product and service, language proficiency, average speed of answer, average handle time for calls, average hold time for calls, average wrap-up or after work time following calls, agent call quality scores, customer satisfaction, transfer rate, average transfer rate, average transfer time, first call resolution rate, average first call resolution rate, average non-interaction time, complaint rate, call quality, customer satisfaction, and agent personality. The utilization parameters may comprise an agent's target utilization, agent idle time and/or average time within a queue. The agents may be classified as one of expert, intermediate, and novice based on the agent parameters. The call center processing system may route the call to an agent based on the agent's classification. The parameters may be stored in a database for use by the call center processing system.

Figure 2:
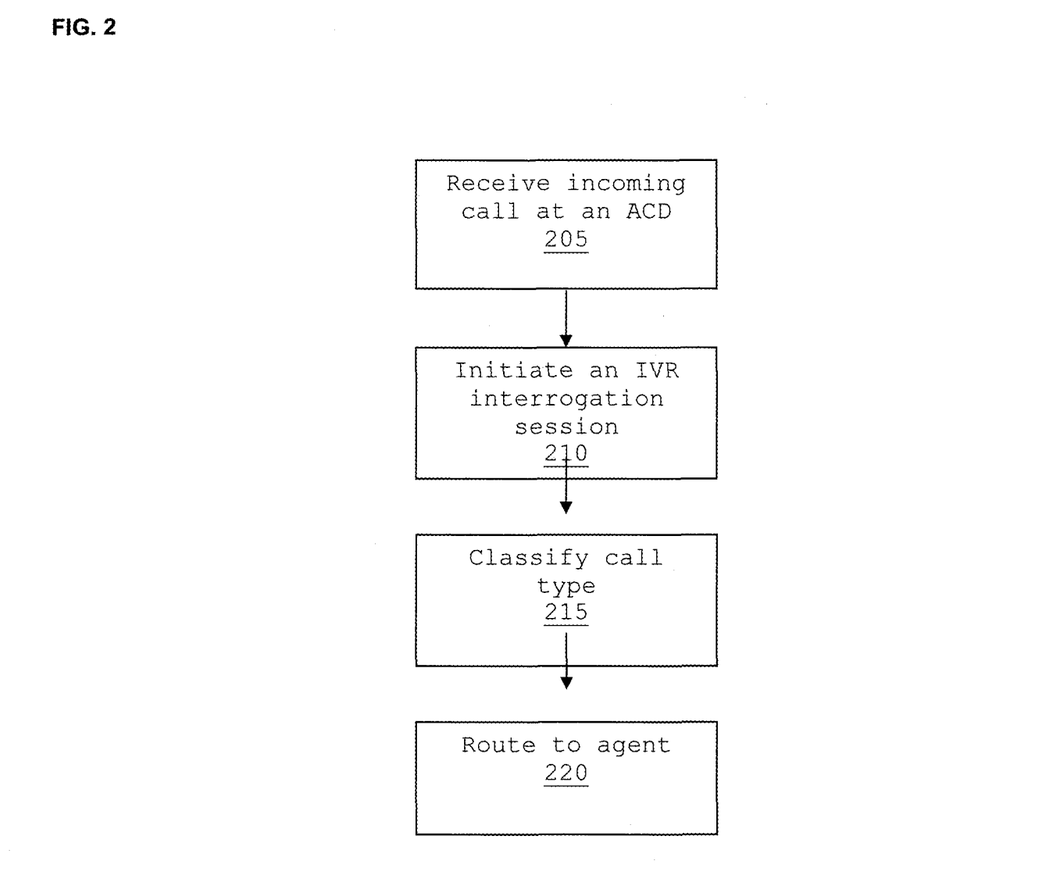
FIG. 2 is a diagram describing certain embodiments of a communication system.

FIG. 2 is a diagram depicting certain embodiments of a method for routing a call received by a call center, such as the call center 30 shown in FIG. 1. A method 200 that may be employed in conjunction with the system illustrated in FIG. 1 will now be described with reference to both FIGS. 1 and 2. Accordingly, in one aspect the method 200 may initiate by an incoming call being received 205 by the call center processing system 40. The incoming call may be received via a suitable network, such as, for example, a communications network 20. The call center processing system 40 may initiate 210 an interactive voice response interrogation session. The call center processing system may classify 215 the call type. For example, the call type may be classified based at least in part on the interactive voice response interrogation session, caller parameters, call center parameters, agent parameters, and/or a triggering event. The call center processing system may route 220 the call to an agent. The method 200 may end following block 220. The various aspects described and shown in the method 200 shown in FIG. 2 may be carried out or performed in any suitable order as desired by one of ordinary skill in the art, without limitation.

According to certain aspects, a computer-implemented method for routing a call to a call center may generally comprise receiving a call from a caller at an automated call distributor, initiating an interactive voice response interrogation session with the caller, and classifying the call as one of a first type and a second type based on the interactive voice response interrogation session, when the call type is classified as the first type, routing the call to at least one of a plurality of branches comprising at least one agent designated to receive calls classified as the first type, and when the call type is classified as the second type, routing the call to a call center comprising at least one agent designated to receive calls classified as the first type and the second type. The first call type may comprise routine call types. Routine call types may comprise deposits, account balances, transactions, on-line banking suspension, card/ATM declines, account openings, account closures, adding owners, CD inquiries/redemption, fee refunds, and any combination thereof. The second call type may comprise sophisticated call types. Sophisticated call types may comprise loans, on-line banking payment, technical issues, business banking, sales, employee refunds, a caller routed by mistake, and any combination thereof.

According to certain aspects, a computer-implemented method for routing a call to a call center may generally comprise identifying the call types associated with a triggering event, estimating a call volume based on each call type associated with the triggering event, and selecting a group of branches from the plurality of branches. In certain aspects, the method may comprise determining the call center parameters. In certain embodiments, estimating the call volume based on each call type associated with the triggering event may comprise estimating the call volume based on historical call information. In certain aspects, selecting a group of branches from the plurality of branches may be based on the interactive voice response interrogation session, the call type, and the geographic region of the call center.

In certain aspects, a triggering event may cause an anticipated increase in the volume of calls received by the call center. The call center may not be able to process the anticipated increase of calls within a reasonable period of time. A triggering event may comprise, for example, business integrations, new product roll-outs, and call center closings. A triggering event may be associated with one or more call types. In certain aspects, the method may comprise selectively routing calls to at least one of a plurality of braches before, during, or after a triggering event by the call center processing system.

According to certain aspects, a computer-implemented method for routing a call to a call center may generally comprise determining the agent's technical expertise, determining the agent's availability, determining the agent's average speed of answer, and determining the agent's customer satisfaction. In certain aspects, the method may comprise determining the agent parameters. In certain aspects, the method may comprise classifying the agent as one of expert, intermediate, and novice based on the agent's technical expertise, availability, average speed of answer, and customer satisfaction. In certain aspects, the agents at the call center may be classified as expert and the agents at the branch may be classified as one of intermediate and novice.

According to certain aspects, a computer-implemented method for routing a call to a call center may generally comprise determining an existing customer base of the at least one of a plurality of branches and determining a capacity of the at least one of a plurality of branches to service a portion of the estimated call volume associated with the triggering event, when the portion of the estimated call volume does not exceed the capacity of the branch, selecting the branch and when the portion of the estimated call volume exceeds the capacity of the branch, not selecting the branch. In certain aspects, determining the capacity of the branches may comprise determining the number of agents available to service the existing customer base of the branch and the predicted number of agents needed to handle a portion of the estimated call volume associated with the triggering event. In certain aspects, the existing customer base may be determined based on the caller parameters. In certain aspects, the capacity of a branch may be determined based on the call center parameters and/or agent parameters.

According to certain aspects, a computer-implemented method for routing a call to a call center may generally comprise determining the geographic region of the caller and determining the geographic region of each of the plurality of branches, when the geographic region of the caller and the branch are the same, selecting the branch and when the geographic region of the caller and the branch are not the same, not selecting the branch. In certain aspects, the geographic region of the call may be determined based on the interactive voice response interrogation session and/or caller parameters. In certain aspects, the method may comprise grouping the plurality of branches into regions based on area codes. In certain aspects, the method may comprise routing the call to one of the plurality of branches based on area code and/or a vector directory number. In certain aspects, the method may comprise distributing the call volume substantially equally the plurality of branches in the same geographic region.

According to certain aspects, a computer-implemented method for routing a call to a call center may generally comprise querying a database for data associated with the caller, when the data matches the caller, classifying the call type as the first call type and when the data does not match the caller, classifying the call type as the second call type. In certain aspects, the method may comprise comparing the data and the information received by the IVR system. In certain aspects, the method may comprise comparing the data and the caller parameters. In certain aspects, the method may comprise comparing the data and the predicted call types. In at least one aspect, the database may comprise a financial database.

According to certain aspects, a computer-implemented method for routing a call to a call center may generally comprise applying a throttle to increase or reduce routing the call to the at least one of a plurality of branches. In certain aspects, the method may comprise applying a throttle based on the call type and an estimated maximum call volume. In certain aspects, the method may comprise applying a throttle based on the caller parameters, call center parameters, agent parameters, and/or a triggering event. In certain aspects, the method may comprise applying a throttle based on weighting the caller parameters, call center parameters, agent parameters, and/or a triggering event. For example, the throttle may be applied during low call volumes to decrease routing the call to the at least one of a plurality of branches. For example, the throttle may be applied during peak call volumes to increase routing the call to the at least one of a plurality of branches. In certain aspects, the method may comprise adjusting the throttle in real time. In certain aspects, adjusting the throttle may improve the real time utilization of calls and/or the average speed of answer.

According to certain aspects, a computer-implemented method for routing a call to a call center may generally comprise routing the call to the call center and re-routing the call from the call center to the branch. In certain aspects, the method may comprise routing the call to the call center and re-routing the call from the call center to the branch after an average speed of answer at the call center is achieved. In certain aspects, the average speed of answer may be at least 30 seconds, such as, for example, 30 seconds to 4 minutes. In certain aspects, the method may comprise routing the call to the call center and re-routing the call from the call center to the branch when a second type is re-classified as a first type. In certain aspects, the re-classification of a second type to a first type may be based on the caller parameters, call center parameters, agent parameters, and/or a triggering event. For example, a second type may be re-classified as a first type during peak call volumes.

According to certain aspects, a computer-implemented method for routing a call to a call center may generally comprise routing the call to the branch and re-routing the call from the branch to the call center. In certain aspects, re-routing the call from the branch to the call center may be based on automatic number identification, a dialed number identification service, a call type, an acquisition code, a language flag, a queue threshold, and a time of day. In certain aspects, re-routing the call from the branch to the call center may comprise re-routing the call when the agent at the branch classifies the caller as a priority caller and the caller is not eligible to be re-routed to one of the plurality of branches. In certain aspects, re-routing the telephone call from the branch to the call center may comprise re-routing the call when the agent at the branch fails to answer the telephone call.

In certain aspects, re-routing the telephone call from the branch to the call center may comprise re-routing the call from an agent classified as one of novice and intermediate to an agent classified as expert. In certain aspects, re-routing the telephone call from the branch to the call center may comprise re-routing the call from the call center to the branch after an average speed of answer at the call center is achieved. In certain aspects, the average speed of answer may be at least 30 seconds.

According to certain aspects, a computer-implemented method for routing a call to a call center may generally comprise receiving a call from a caller at an automated call distributor, initiating an interactive voice response interrogation session with the caller, authenticating the call based on the interactive voice response interrogation session, determining the geographic region of the caller based on the interactive voice response interrogation session, and predicting the call as one of a first type and a second type based on the interactive voice response interrogation session, when the call type is classified as the first type, routing the call to a branch in the caller's geographic region comprising at least one agent designated to receive calls classified as the first type, and when the call type is classified as the second type, routing the call to a call center comprising at least one agent designated to receive calls classified as the first type and the second type.

In certain aspects, authenticating the call may comprise querying a database for data associated with the caller, when the data matches the caller, authenticating the caller, and when the data does not match the caller, not authenticating the caller. In certain aspects, authenticating the call may comprise comparing the data and the information received by the IVR system. In certain aspects, authenticating the call may comprise comparing the data and the caller parameters. In at least one aspect, the database may comprise a financial database.

In certain aspects, predicting the call as one of a first type and a second type may be based on the caller parameters, call center parameters, agent parameters, and/or a triggering event. In certain aspects, predicting the call as one of a first type and a second type may comprise predicting a triggering event. In at least one aspect, the first type and/or the second type may be associated with the triggering event. In certain aspects, predicting the call as one of a first type and a second type may be based the estimated call volume associated with the triggering event. In certain aspects, predicting the call as one of a first type and a second type may comprise predicting the identity of likely callers and/or the geographic region of likely callers. In certain aspects, predicting the call as one of a first type and a second type may be based on caller parameters of likely callers.

According to certain aspects, a computer-implemented method for routing a call to a call center may generally comprise identifying the call types associated with a triggering event, querying a customer database for data associated with the caller, when the call type associated with the triggering event matches the customer data, classifying the call type as the first call type and when the call type associated with the triggering event does not match the customer data, classifying the call type as the second call type.

According to certain aspects, a computer-implemented method for routing a call to a call center may generally comprise determining the call type by presenting at least one interactive audio menu comprising a plurality of options to the caller and prompting the caller to select one of the plurality of options. In certain aspects, the method may comprise presenting at least one interactive audio menu comprising options associated with a financial database. In certain aspects, the method may comprise presenting at least one interactive audio menu comprising options associated with a triggering event. In certain aspects, the method may comprise presenting at least one interactive audio menu comprising options associated with a predicted call type. In certain aspects, the method may comprise presenting an option to be routed to an agent at the call center.

According to certain aspects, a computer-implemented method for routing a call to a call center may generally comprise identifying the call types associated with a triggering event, identifying the call types associated with a financial institution, and sorting the call types associated with the triggering event and the call types associated with the financial institution, when the call type associated with the triggering event matches the call type associated with the financial institution, classifying the call type as the first call type, and when the call type associated with the triggering event does not match the call type associated with the financial institution, classifying the call type as the second call type. In certain aspects call types associated with a triggering event may comprise integrations, new product roll-outs, and call center closings. In certain aspects call types associated with financial institution may comprise routine call types and/or sophisticated call types.

In certain aspects, sorting the call types may be based on the predicted call types associated with a triggering event. In certain aspects, sorting the call types may be based on the information received by the IVR system. In certain aspects, the method may comprise comparing the data and the information received by the IVR system. In certain aspects, the method may comprise comparing the data and the caller parameters. In certain aspects, sorting the call types may comprise querying a database for data associated with the caller. In certain aspects, sorting the call types may comprise comparing the data and the information received by the IVR system. In certain aspects, sorting the call types may comprise comparing the data and the caller parameters.

Figure 3:
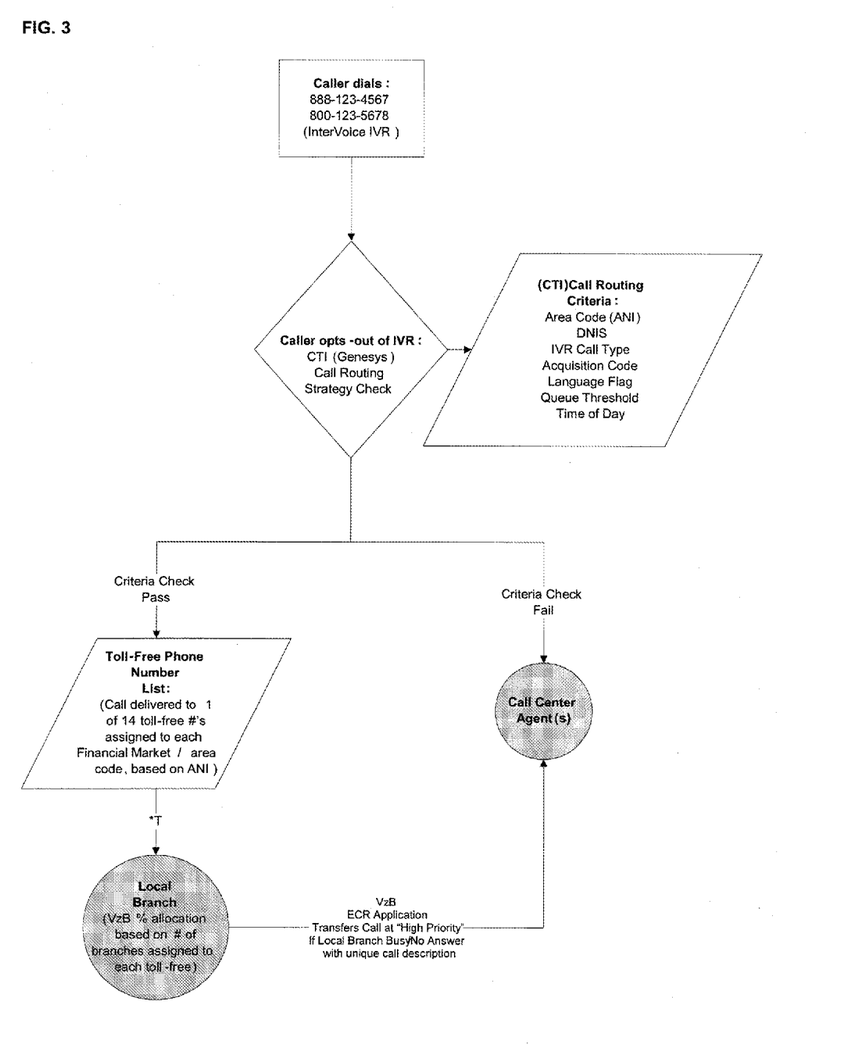
FIG. 3 is a diagram describing certain embodiments of a communication system.

FIG. 3 is a diagram depicting certain embodiments of a method for routing a call received by a call center, such as the call center 30 shown in FIG. 1. In one aspect the method may initiate by an incoming call to a toll-free number being received by the call center processing system. The incoming call may be received via a suitable network, such as, for example, a communications network. The call center processing system may initiate an interactive voice response interrogation session. The caller may opt out of the interactive voice response interrogation session. The call center processing system may initiate a computer telephone integration (CTI) call routing strategy check. The CTI call routing strategy check may be based on call routing criteria selected from the group consisting of area code (ANI), DNIS, IVR call type, acquisition code, caller's language (language flag), queue threshold, and time of day. The call routing criteria may identify the caller and/or classify the call.

The call center processing system may route the call to an agent. The caller may be routed to an agent when the caller fails the call routing strategy check. The caller may fail the call routing strategy check when the caller fails to provide call routing criteria. The caller may be routed to a call center based on at least one of geographic region, area code, and ANI when the caller passes the call routing strategy check. The caller may pass the call routing strategy check when the caller provides call routing criteria. The caller may be routed from the call center to one of a plurality of branches before, during, and/or after a triggering event. The at least one of a plurality of braches may be associated with the toll-free number.

The call center processing system may initiate an enhanced call routing (ECR) application for re-routing the call from the branch to the call center based on caller parameters, call center parameters, agent parameters, and/or a triggering event. In certain aspects, re-routing the call from the branch to the call center may comprise re-routing the call when the agent at the branch classifies the caller as a priority caller and the caller is not eligible to be re-routed to one of the plurality of branches. In certain aspects, re-routing the telephone call from the branch to the call center may comprise re-routing the call when the agent at the branch fails to answer the telephone call. The various aspects described and shown in the method shown in FIG. 3 may be carried out or performed in any suitable order as desired by one of ordinary skill in the art, without limitation.

The examples presented herein are intended to illustrate potential and specific implementations of the method disclosed in the present specification. It can be appreciated that the examples are intended primarily for purposes of illustration and clarity of disclosure for those skilled in the art. No particular aspect or aspects of the examples are necessarily intended to limit the scope of the present disclosure. For example, no particular aspect or aspects of the examples of system architectures, user interface layouts, or screen displays described herein are necessarily intended to limit the scope of the present disclosure.

It is to be understood that the figures and descriptions of the present disclosure have been simplified to illustrate elements that are relevant for a clear understanding of the present disclosure, while eliminating, for purposes of clarity, other elements. Those of ordinary skill in the art will recognize, however, that these sorts of focused discussions would not facilitate a better understanding of the present disclosure, and therefore, a more detailed description of such elements is not provided herein.

Any element expressed herein as a means for performing a specified function is intended to encompass any way of performing that function including, for example, a combination of elements that performs that function. Furthermore the claims may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various aspects, modules or software may be used to practice certain aspects of the methods disclosed herein. For example, software-as-a-service (SaaS) models or application service provider (ASP) models may be employed as software application delivery models to communicate software applications to clients or other users. Such software applications may be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various aspects of the methods disclosed herein.

Moreover, the processes associated with the present embodiments may be executed by programmable equipment, such as computers, or other processor-based devices. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It may also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It may be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

Figure 4:
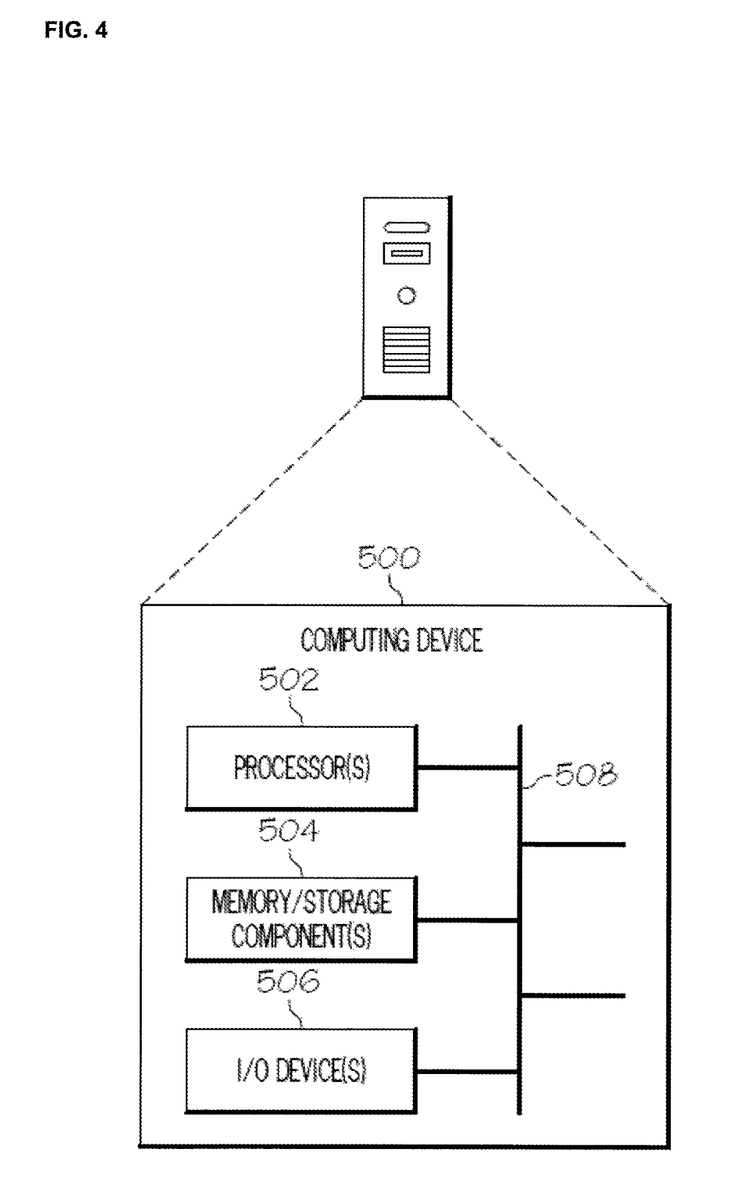
FIG. 4 illustrates one embodiment of a computer for executing instructions to perform certain process aspects described herein.

FIG. 4 illustrates one embodiment of a computer for executing instructions to perform certain process aspects described herein. FIG. 4 illustrates one embodiment of a computing device 500 which can be used in one embodiment of a system to implement the various described embodiments. The computing device 500 may be employed to implement one or more of the computing devices, such as the agent terminal 80 and remote agent terminal 90 of the communication system described above in FIG. 1 or any other suitably configured computing device. For the sake of clarity, the computing device 500 is illustrated and described here in the context of a single computing device. However, it is to be appreciated and understood that any number of suitably configured computing devices can be used to implement a described embodiment. For example, in at least some implementations, multiple communicatively linked computing devices are used. One or more of these devices can be communicatively linked in any suitable way such as via one or more networks. One or more networks can include, without limitation: the Internet, one or more local area networks (LANs), one or more wide area networks (WANs) or any combination thereof.

In this example, the computing device 500 comprises one or more processor circuits or processing units 502, one or more memory circuits and/or storage circuit component(s) 504 and one or more input/output (I/O) circuit devices 506. Additionally, the computing device 500 comprises a bus 508 that allows the various circuit components and devices to communicate with one another. The bus 508 represents one or more of any of several types of bus structures, including a memory bus or memory controller, a peripheral bus, an accelerated graphics port, and a processor or local bus using any of a variety of bus architectures. The bus 508 may comprise wired and/or wireless buses.

The processing unit 502 may be responsible for executing various software programs such as system programs, applications programs, and/or modules to provide computing and processing operations for the computing device 500. The processing unit 502 may be responsible for performing various voice and data communications operations for the computing device 500 such as transmitting and receiving voice and data information over one or more wired or wireless communications channels. Although the processing unit 502 of the computing device 500 is shown with a single processor architecture, it may be appreciated that the computing device 500 may use any suitable processor architecture and/or any suitable number of processors in accordance with the described embodiments. In one embodiment, the processing unit 502 may be implemented using a single integrated processor.

The processing unit 502 may be implemented as a host central processing unit (CPU) using any suitable processor circuit or logic device (circuit), such as a as a general purpose processor. The processing unit 502 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 502 may be coupled to the memory and/or storage component(s) 504 through the bus 508. The memory bus 508 may comprise any suitable interface and/or bus architecture for allowing the processing unit 502 to access the memory and/or storage component(s) 504. Although the memory and/or storage component(s) 504 may be shown as being separate from the processing unit 502 for purposes of illustration, it is worthy to note that in various embodiments some portion or the entire memory and/or storage component(s) 504 may be included on the same integrated circuit as the processing unit 502. Alternatively, some portion or the entire memory and/or storage component(s) 504 may be disposed on an integrated circuit or other medium (e.g., hard disk drive) external to the integrated circuit of the processing unit 502. In various embodiments, the computing device 500 may comprise an expansion slot to support a multimedia and/or memory card, for example.

The memory and/or storage component(s) 504 represent one or more computer-readable media. The memory and/or storage component(s) 504 may be implemented using any computer-readable media capable of storing data such as volatile or non-volatile memory, removable or non-removable memory, erasable or non-erasable memory, writeable or re-writeable memory, and so forth. The memory and/or storage component(s) 504 may comprise volatile media (e.g., random access memory (RAM)) and/or nonvolatile media (e.g., read only memory (ROM), Flash memory, optical disks, magnetic disks and the like). The memory and/or storage component(s) 504 may comprise fixed media (e.g., RAM, ROM, a fixed hard drive, etc.) as well as removable media (e.g., a Flash memory drive, a removable hard drive, an optical disk, etc.). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 506 allow a user to enter commands and information to the computing device 500, and also allow information to be presented to the user and/or other components or devices. Examples of input devices include a keyboard, a cursor control device (e.g., a mouse), a microphone, a scanner and the like. Examples of output devices include a display device (e.g., a monitor or projector, speakers, a printer, a network card, etc.). The computing device 500 may comprise an alphanumeric keypad coupled to the processing unit 502. The keypad may comprise, for example, a QWERTY key layout and an integrated number dial pad. The computing device 500 may comprise a display coupled to the processing unit 502. The display may comprise any suitable visual interface for displaying content to a user of the computing device 500. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 502 may be arranged to provide processing or computing resources to the computing device 500. For example, the processing unit 502 may be responsible for executing various software programs including system programs such as operating system (OS) and application programs. System programs generally may assist in the running of the computing device 500 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, or other suitable OS in accordance with the described embodiments. The computing device 500 may comprise other system programs such as device drivers, programming tools, utility programs, software libraries, application programming interfaces (APIs), and so forth.

In various embodiments, a single component may be replaced by multiple components, and multiple components may be replaced by a single component, to perform a given function or functions. Except where such substitution would not be operative to practice embodiments or aspects of the systems and methods, such substitution is within the scope of the present disclosure. Any of the servers described herein, for example, may be replaced by a "server farm" or other grouping of networked servers (e.g., a group of server blades) that are located and configured for cooperative functions. It may be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments of the system and the aspects of the methods described herein, or components or parts thereof, may be implemented in many different embodiments of software, firmware, and/or hardware, or modules thereof. The software code or specialized control hardware used to implement some of the present embodiments of the system and/or aspects of the method are not limiting to the particular examples disclosed in the present specification. For example, the embodiments described hereinabove may be implemented in computer software using any suitable computer programming language or platform such as .NET, SQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the systems and aspects of the methods disclosed in the present specification based on the description herein with only a reasonable effort and without undue experimentation.

Various embodiments of the systems and aspects of the methods described herein may employ one or more electronic computer networks to promote communication among different components, to transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN), metropolitan area network (MAN), wide area network (WAN), virtual private network (VPN), storage area network (SAN), or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the systems and aspects of the methods described herein may employ internet working for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch may possess multiple ports, such that most of the network is connected directly to the switch, or another switch that is in turn connected to a switch. The term "switch" may also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, tangent) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the system include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments of the systems and aspects of the methods described herein may be configured and/or programmed to include one or more of the above-described electronic, computer-based elements and components. In addition, these elements and components may be particularly configured to execute the various rules, algorithms, programs, processes, and method steps described herein.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context. Furthermore, an action such as "storing," when used in reference to a computer or computer system, refers to any suitable type of storing operation including, for example, storing a value to memory, storing a value to cache memory, storing a value to a processor register, and/or storing a value to a non-volatile data storage device.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments and aspects have been illustrated and described, it would be obvious to those skilled in the art that various other changes and modifications can be made without departing from the scope of the present disclosure. Those skilled in the art will recognize, or be able to ascertain using no more than routine experimentation, numerous equivalents to the specific apparatuses and methods described herein, including alternatives, variants, additions, deletions, modifications and substitutions. This disclosure including the appended claims is therefore intended to cover all such changes and modifications that are within the scope of this application.

What is claimed is:

1. A computer-implemented system for routing a call to a call center, the system comprising:
a computer system comprising at least one processor; and
a storage device comprising a computer-readable medium in communication with the processor and storing instructions configured to be executed by the processor to:

receive a call from a caller at an automated call distributor;

attempt to initiate an interactive voice response interrogation session with the caller;

upon acceptance of the interactive voice response interrogation session:

receive information from the caller in response to the interactive voice response interrogation session;

classify the call as at least one of a first type and a second type based on the information received from the caller in response to the interactive voice response interrogation session;

when the call type is classified as the first type, route the call to a first branch of a plurality of branches comprising at least one agent designated to receive calls classified as the first type; and when the call type is classified as the second type, route the call to a call center comprising at least one agent designated to receive calls classified as at least one of the first type and the second type; and upon denial of the interactive voice response interrogation session:

initiate a computer telephone integration ("CTI") call routing strategy check:

upon the call passing the CTI strategy check, route the call to a second branch comprising at least one agent designated to receive calls that pass the CTI strategy check; and upon the call failing the CTI strategy check, route the call to the call center.

2. A computer-implemented system for routing a call to a call center, the system comprising:

a computer system comprising at least one processor; and a storage device comprising a computer-readable medium in communication with the processor and storing instructions configured to be executed by the processor to:

receive a call from a caller at an automated call distributor;

initiate an interactive voice response interrogation session with the caller;

classify the call as one of a first type and a second type based on the interactive voice response interrogation session;

when the call type is classified as the first type, route the call to at least one of a plurality of branches comprising at least one agent designated to receive calls classified as the first type;

when the call type is classified as the second type, route the call to a call center comprising at least one agent designated to receive calls classified as at least one of the first type and the second type;

identify the call types associated with a triggering event;

estimate a call volume based on each call type associated with the triggering event; and select a group of branches from the plurality of branches.

3. The system of claim 1 comprising instructions configured to be executed by the processor to:

determine the agent's technical expertise;

determine the agent's availability;

determine the agent's average speed of answer; and determine the agent's customer satisfaction.

4. The system of claim 2 comprising instructions configured to be executed by the processor to estimate the call volume based on historical call information.

5. The system of claim 2 comprising instructions configured to be executed by the processor to:

determine an existing customer base of the at least one of a plurality of branches; and determine a capacity of the at least one of a plurality of branches to service a portion of the estimated call volume associated with the triggering event;

when the portion of the estimated call volume does not exceed the capacity of the branch, select the branch; and when the portion of the estimated call volume exceeds the capacity of the branch, not select the branch.

6. The system of claim 2 comprising instructions configured to be executed by the processor to:

determine the geographic region of the caller; and determine the geographic region of each of the plurality of branches;

when the geographic region of the caller and the branch are the same, select the branch; and when the geographic region of the caller and the branch are not the same, not select the branch.

7. The system of claim 6 comprising instructions configured to be executed by the processor to distribute the call volume substantially equally among the plurality of branches in the same geographic region.

8. The system of claim 2 comprising instructions configured to be executed by the processor to identify the caller.

9. The system of claim 1, wherein the first call type comprises routine call types and the second call type comprises sophisticated call types.

10. The system of claim 1 comprising instructions configured to be executed by the processor to query a database for data associated with the caller;

receive the data associated with the caller from the database;

compare the information received from the caller and the data associated with the caller; and when the data from the database matches the information received from the caller, classify the call type as the first call type; and when the data from the database does not match the information received from the caller, classify the call type as the second call type.

11. The system of claim 1 comprising instructions configured to be executed by the processor to route the call from the first branch to the call center.

12. The system of claim 1 comprising instructions configured to be executed by the processor to apply a throttle to reduce routing of at least one additional call to the first branch of the plurality of branches.

13. The system of claim 1 comprising instructions configured to be executed by the processor to apply a throttle based on a predetermined call type and an estimated maximum call volume to reduce routing of at least one additional call to the first branch of the plurality of branches.

14. The system of claim 1 comprising instructions configured to be executed by the processor to:

route the call to the call center; and re-route the call from the call center to the first branch after an average speed of answer at the call center is achieved.

15. The system of claim 1 comprising instructions configured to be executed by the processor to classify the call as the second type and re-classify the call as the first type during a triggering event.

16. A computer-implemented system for routing a call to a call center, the system comprising:

a computer system comprising at least one processor; and a storage device comprising a computer-readable medium in communication with the processor and storing instructions configured to be executed by the processor to:

receive a call from a caller at an automated call distributor;

initiate an interactive voice response interrogation session with the caller;

authenticate the call based on the interactive voice response interrogation session;

determine the geographic region of the caller based on the interactive voice response interrogation session; and predict the call as one of a first type and a second type based on the interactive voice response interrogation session;

when the call type is classified as the first type, route the call to a branch in the caller's geographic region comprising at least one agent designated to receive calls classified as the first type; and when the call type is classified as the second type, route the call to a call center comprising at least one agent designated to receive calls classified as the first type and the second type.

17. The system of claim 16 comprising instructions configured to be executed by the processor to:

identify the call types associated with a triggering event;

query a customer database for data associated with the caller; and when the call type associated with the triggering event matches the customer data, classify the call type as the first call type; and when the call type associated with the triggering event does not match the customer data, classify the call type as the second call type.

18. The system of claim 16 comprising instructions configured to be executed by the processor to:

determine the call type by presenting at least one interactive audio menu comprising a plurality of options to the caller; and prompt the caller to select one of the plurality of options.

19. The system of claim 16 comprising instructions configured to be executed by the processor to present at least one interactive audio menu comprising options associated with at least one call type associated with a triggering event.

20. The system of claim 16 comprising instructions configured to be executed by the processor to:

identify the call types associated with a triggering event;

identify the call types associated with a financial institution; and sort the call types associated with the triggering event and the call types associated with the financial institution;

when the call type associated with the triggering event matches the call type associated with the financial institution, classify the call type as the first call type; and when the call type associated with the triggering event does not match the call type associated with the financial institution, classify the call type as the second call type.

21. The system of claim 1 wherein the first branch is a branch of a financial institution and the second branch is a branch of a financial institution and wherein the first branch and the second branch are the same.

* * * * *